US012689521B2

(12) United States Patent　(10) Patent No.:　US 12,689,521 B2

Weidner　(45) Date of Patent:　Jul. 21, 2026

(54) CIRCUITRY FOR PROTECTING A COMMUNICATION CHANNEL

(71) Applicant: WAGO Verwaltungsgesellschaft mbH, Minden (DE)

(72) Inventor: Markus Weidner, Minden (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 113 days.

(21) Appl. No.: 18/615,518

(22) Filed: Mar. 25, 2024

(65) Prior Publication Data

US 2024/0323031 A1　Sep. 26, 2024

(30) Foreign Application Priority Data

Mar. 23, 2023　(DE) ..................... 10 2023 107 401.6

(51) Int. Cl.
H04L 9/32　(2006.01)
(52) U.S. Cl.
CPC .................................. H04L 9/3247 (2013.01)
(58) Field of Classification Search
CPC ..................................................... H04L 9/3247
See application file for complete search history.

(56) References Cited

U.S. PATENT DOCUMENTS

| | | | |
|---|---|---|---|
| 9,699,184 B2 | 7/2017 | Heidt et al. | |
| 10,951,420 B2 * | 3/2021 | Borne-Pons | .......... H04L 9/3255 |
| 11,258,611 B2 * | 2/2022 | Seidenberg | ............. H04L 9/088 |
| 2015/0135271 A1 | 5/2015 | Forest | |
| 2017/0373844 A1 * | 12/2017 | Sykora | .................... H04L 9/006 |

FOREIGN PATENT DOCUMENTS

| | | |
|---|---|---|
| DE | 102014116111 A1 | 5/2015 |
| DE | 102015115295 A1 | 3/2016 |

* cited by examiner

*Primary Examiner* — Bradley W Holder
(74) *Attorney, Agent, or Firm* — Muncy, Geissler, Olds & Lowe, P.C.

(57)　　ABSTRACT

A transmitter which comprises a controller configured to receive data that is provided with a signature, derive control signals from the data, and output the control signals. The transmitter further comprises an integrated circuit configured to verify the signature and circuitry configured to, depending on a verification result output by the integrated circuit, reject the control signals or transmit the control signals to a receiver via a communication channel.

9 Claims, 4 Drawing Sheets

CIRCUITRY FOR PROTECTING A COMMUNICATION CHANNEL

This nonprovisional application claims priority under 35 U.S.C. § 119(a) to German Patent Application No. 10 2023 107 401.6, which was filed in Germany on Mar. 23, 2023, and which is herein incorporated by reference.

BACKGROUND OF THE INVENTION

Field of the Invention

The present invention relates to a transmitter with circuitry for protecting a communication channel. In particular, the present invention relates to circuitry for protecting a communication channel based on an output of an integrated circuit which verifies a signature with which payload transmitted via the communication channel is provided.

Description of the Background Art

As deviations in data transmitted via communication channels may cause a machine or process to enter a dangerous state, there is a need in the field of automation to detect (and possibly correct) randomly occurring transmission errors and/or to make intentionally induced manipulations more difficult. For example, to detect randomly occurring errors, data may be transmitted redundantly (e.g. via different communication channels and validated by comparing the redundantly transmitted data at the receiver side.

US 2020/0356715, which is incorporated herein by reference, illustrates a system for producing a data stream on the basis of redundant information. US 2010/0306630, which is incorporated herein by reference, shows a system for sending signals between modules. US 2015/0135271, which is incorporated herein by reference, illustrates a device and method to enforce security tagging of embedded network communications. US 2016/0080375, which is incorporated herein by reference, illustrates a device and method for processing data. Further, the attached Appendix, which is incorporated herein by reference, illustrates a fieldbus coupler by the applicant that can be implemented to be used with the present invention.

SUMMARY

A transmitter may comprise a controller configured to receive data that is provided with a signature, derive control signals from the data, and output the control signals. The transmitter may further comprise an integrated circuit configured to verify the signature and circuitry configured to, depending on a verification result output by the integrated circuit, reject the control signals or transmit the control signals to a receiver via a communication channel.

The term "communication channel", as used throughout the description and claims, is, in particular, to be understood as referring to a wired transmission link via which electrical signals (representing the data) may be transmitted. The communication channel may be divided into several sections which are interconnected by electronic devices. The electronic devices may be configured to add further data to the payload included in the data, separate data added to the payload from the payload, or process the payload, for example by deriving other data or signals from the payload. Alternatively, the communication channel may be a radio link. Furthermore, the term "controller", as used throughout the description and claims, is, in particular, to be understood as referring to an electronic device which is configured to output control signals directed at controlling the state of an actuator. The control signals may, for example, be transmitted to a control input of an actuator and cause the actuator to be activated or deactivated. For example, the actuator may perform mechanical work when activated and no mechanical work when deactivated. Furthermore, the control signals may be directed at causing an activated actuator to output more or less mechanical power. Furthermore, the control signals may be a data packet that is to be transmitted to another control unit via a communication link.

Moreover, the term "signature", as used throughout the description and claims, is, in particular, to be understood as referring to a digital value calculated over the payload using a (secret) signature key, which allows the integrity of the payload and the identity of a unit that has generated the signature to be verified by use of a verification key. Moreover, the term "data", as used throughout the description and claims, is, in particular, to be understood as referring to a sequence of digital values which represent information. Furthermore, the term "input", as used throughout the description and claims, is, in particular, to be understood as referring to an electrical port of a device, via which electrical signals can be input into the device. For example, the device may be configured to measure voltages applied to the port and assign them to digital values. Furthermore, the term "deriving", as used throughout the description and claims, is, in particular, to be understood as referring to the assignment of state data to control signals. For example, the data may comprise or represent sensor data and the controller may be configured to derive control signals from the sensor data.

Furthermore, the term "integrated circuit", as used throughout the description and claims, is, in particular, to be understood as referring to an electronic component which is arranged on a printed circuit board and is connected to other components to form a functional arrangement. Furthermore, the term "circuitry", as used throughout the description and claims, is, in particular, to be understood as referring to a separable part of a device which realizes a partial function of the device. Furthermore, the term "output", as used throughout the description and claims, is, in particular, to be understood as referring to an electrical port of a device via which electrical signals can be output. Furthermore, the term "rejecting", as used throughout the description and claims, is, in particular, to be understood as referring to preventing the forwarding of signals, e.g., by connecting a voltage-carrying signal line to ground so that only zero voltage is transmitted instead of the voltage curve representing the signals.

The integrated circuit may further be configured, when verifying the signature, to verify an integrity of the data and/or an identity of a sender of the data.

For example, the integrated circuit may comprise a memory in which a verification key assigned to the sender or received from the sender may be stored for verifying the signature.

The integrated circuit may further be configured to receive the first data and/or the signature from the controller. The integrated circuit may further be configured to verify the data. For example, the electronic device may determine an age of the data and/or assign the data to a hazard level.

The hazard level and/or the age may be taken into account when generating the verification result. For example, the verification result may indicate that the control signals are to be rejected if the assigned hazard level is above a hazard level limit. Furthermore, the verification result may indicate that the control signals are to be rejected if the data (i.e., in particular, the information represented by the data) is older than a permissible maximum age (or a maximum age specified by the data).

The integrated circuit may further be configured to provide a sender of the data with further data which is to be used by the sender when generating the signature.

For example, the sender may be configured to calculate the signature over the data and the further data or a value derived from the and the further data. Furthermore, the sender may be configured to integrate the further data into a data packet which is signed with the signature and comprises the data.

The integrated circuit may then verify the use of said further data and/or the presence of said further data in the data packet. Furthermore, the integrated circuit may further be configured to output a verification result indicating that the control signals are to be rejected if the further data has not been used when the signature was generated or if the further data is not present in the data packet.

The integrated circuit may comprise an interface and the integrated circuit may be further configured to receive a key for carrying out the verification of the signature via the interface.

The interface may be configured to be not addressable by the controller or to discard commands from the controller. For example, there may be no connection between the interfaces of the controller and the interface of integrated circuit. As a result, manipulation of the verification of the signature by the integrated circuit may be prevented even if the controller is compromised.

The integrated circuit may be further configured to receive a password via the interface and accept the signature from the controller or another communication partner only if the communication partner has authenticated itself with the password.

The authentication may be required at each restart of the transmitter, after a certain time interval, or each time a certain amount of data has been processed.

The transmitter may further comprise another controller and another circuitry. The other controller may be configured to receive the data that is provided with the signature, derive control signals from the data, and output the control signals. The other circuitry may be configured to, depending on a verification result output by the integrated circuit, reject the control signals output by the other controller or transmit the control signals output by the other controller via another communication channel. Both communication channels may link the transmitter to a receiver which receives the control signals and compares them before use to check whether the control signals have been altered during transmission.

In this way, a single integrated circuit can monitor the transmission of control signals via several communication channels.

It should be understood that the features described in connection with the transmitter may also be features of a method relating to a possible use of the transmitter.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
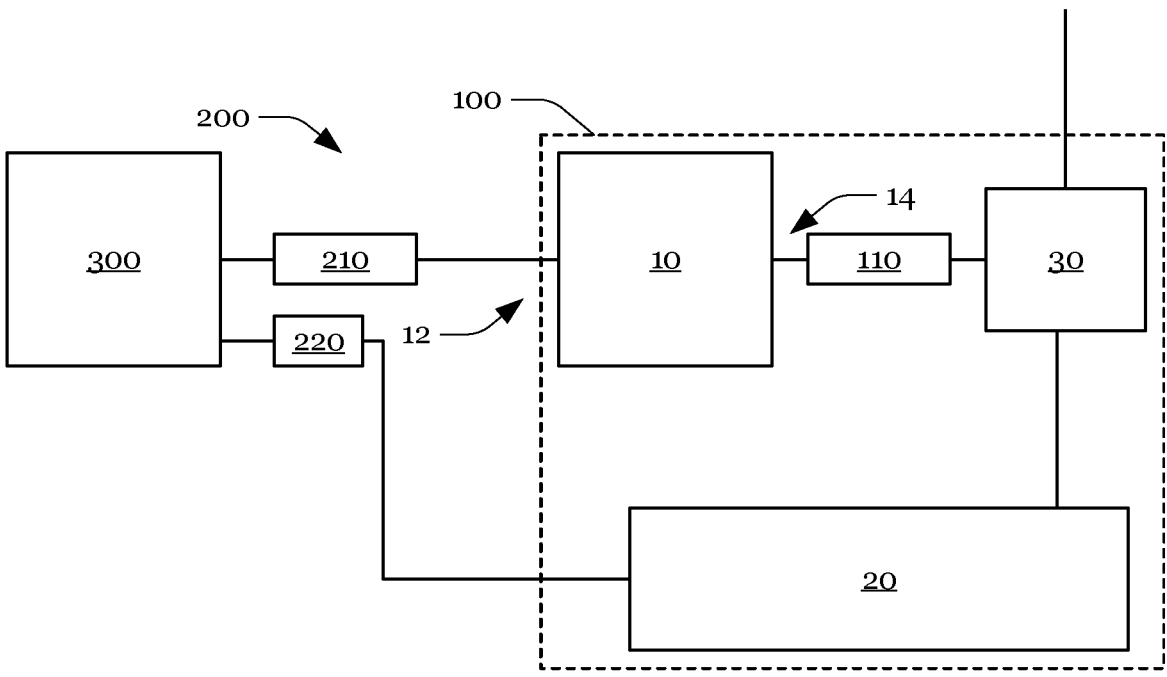
FIG. 1 is a schematic representation of a transmitter.

FIG. 1 shows a schematic representation of a transmitter 100. The transmitter 100 comprises a controller 10, an integrated circuit 20 (or chip) and circuitry 30. The transmitter 100 receives payload 210 and a signature 220 from the sender 300, wherein the signature 220 was calculated by the sender 300 over the payload 210 or a value derived from the payload 210 (e.g. a "hash") by means of a (secret) signature key. The signature 220 is input into and verified by the integrated circuit 20. By verifying the signature 220, the integrated circuit 20 verifies, in particular, the identity of the sender 300. The integrated circuit 20 outputs the result of the verification to the circuitry 30. Depending on the result of the verification, the circuitry 30 forwards or rejects the control signals 110 which are derived by the controller 10 from the payload 210 input at port 12, and output at port 14. The transmitter 100 is configured to prohibit any influence of the controller 10 on the behavior of the integrated circuit 20.

Figure 2:
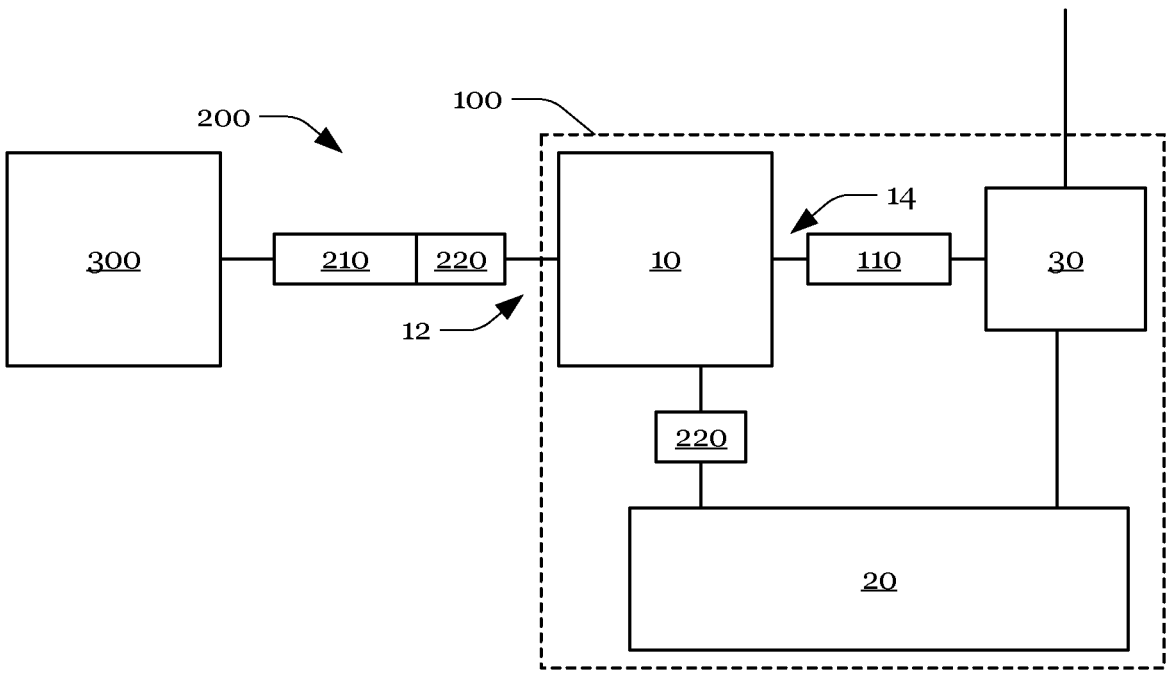
FIG. 2 illustrates a modification of the transmitter shown in FIG. 1.
Figure 3:
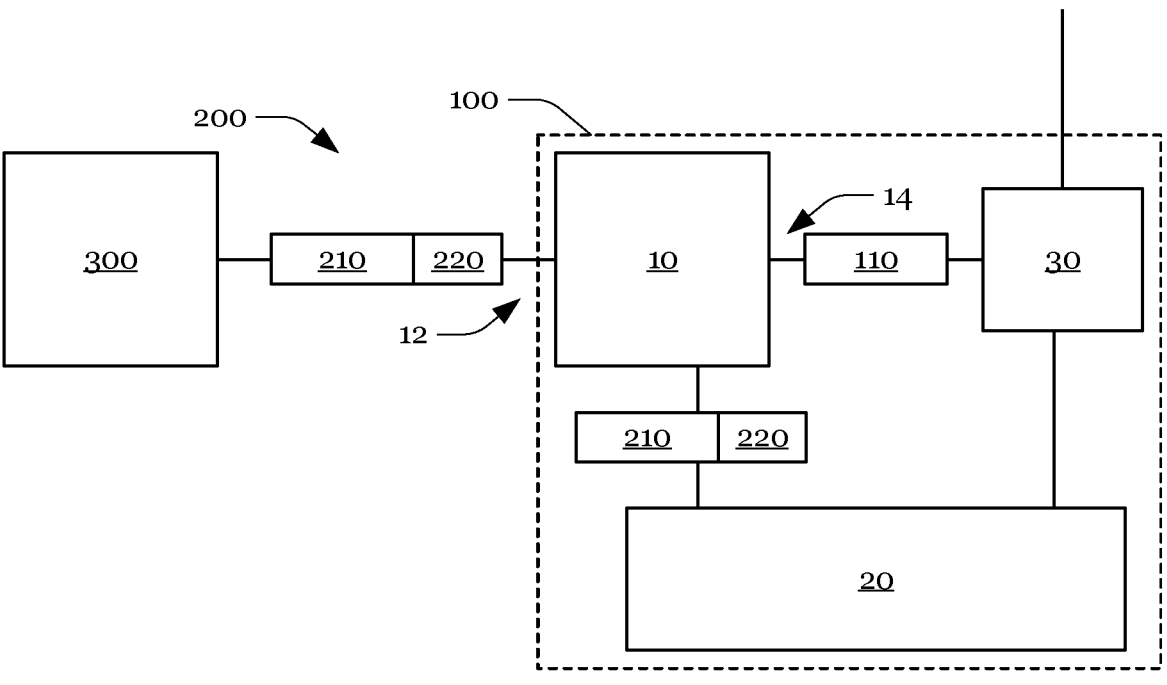
FIG. 3 illustrates a modification of the transmitter shown in FIG. 2.

FIG. 2 shows a modification of the transmitter 100 shown in FIG. 1, in which the transmitter 100 receives a data packet 200 from the sender 300, which comprises the payload 210 and the signature 220. The controller 10 reads the data packet 200 via port 12 and forwards the signature 220 (and possibly the value derived from the payload 210) to the integrated circuit 20. As shown in FIG. 3, the controller 10 may also forward the payload 210 to the integrated circuit 20 in addition to the signature 220. This enables the integrated circuit 20 to also verify the integrity of the payload 210. Furthermore, the integrated circuit 20 may check how old the payload 210, or rather the information represented by the payload, is. For example, it may be envisaged that the integrated circuit 20 outputs a verification result which causes the control signals 110 to be rejected if the age of the information represented by the payload data 210 exceeds a maximum age. The maximum age may be specified as part of a configuration of the integrated circuit 20, or by the received payload 210 itself (e.g., in that the payload 210 specifies that it is valid for 1 second from the time it has been generated), or be calculated individually for the received payload 210 by the integrated circuit 20.

Furthermore, the integrated circuit 20 can verify whether the payload 210 leads to potentially dangerous control signals 110 and output a verification result, which causes the control signals 110 to be rejected if the hazard level of the payload 210 exceeds a limit hazard level. Alternatively, the integrated circuit 20 may output a verification result representing the hazard level and causing the circuit 30 to reject all control signals 110 that are potentially more hazardous than covered by the hazard level associated with the payload 210. For example, the integrated circuit 20 can assign a hazard level "orange" to the payload 210 and output a verification result which causes the control signals 110 to be rejected by the circuit 30 if the hazard level of the control signals 110 derived from the payload 210 exceeds the hazard level "orange".

Figure 4:
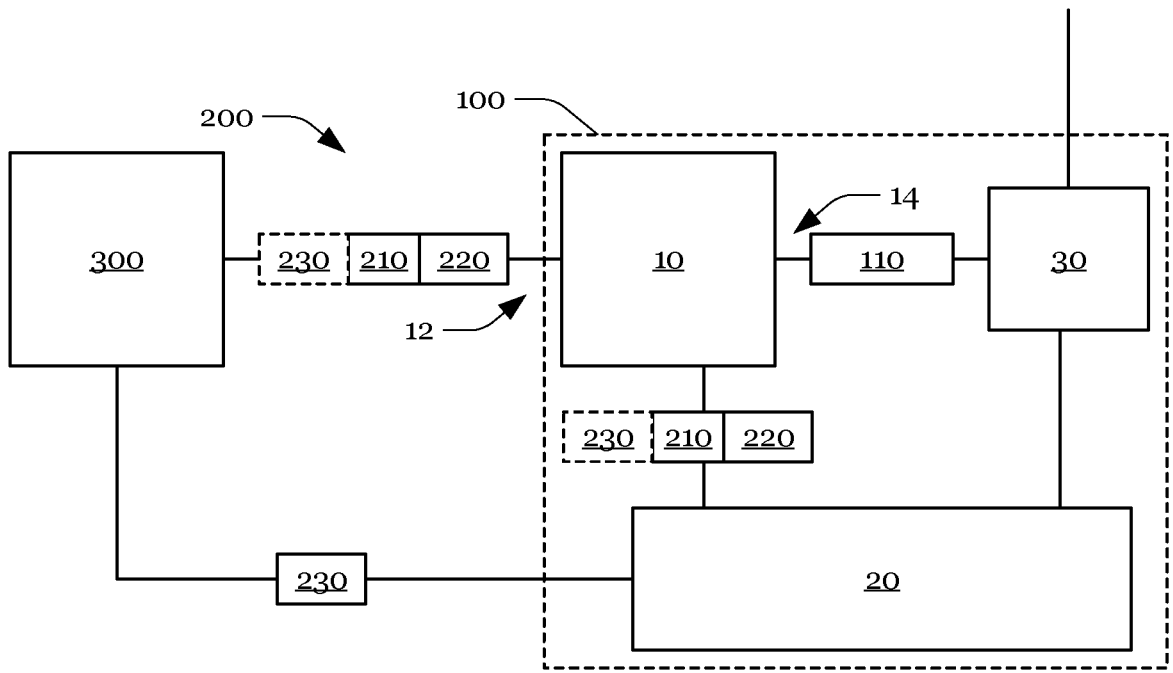
FIG. 4 illustrates a modification of the transmitter shown in FIG. 3.

As shown in FIG. 4, the integrated circuit 20 may provide the sender 300 with random data 230, which is to be used by the sender 300 when generating the signature 220. For example, the sender 300 may calculate the signature 220 not only based on the payload 210, but based on the payload 210 and the random data 230 received from the integrated circuit 20 and, if required, integrate the random data 230 into the data packet 200. As shown in FIG. 4, the random data 230 may be transmitted directly from the integrated circuit 20 to the sender 300 or may be transmitted from the integrated circuit 20 to the controller 10 which then forwards the random data 230 to the sender 300 via the communication channel. Instead of random data, data that changes according to a certain pattern, such as a sequence of numbers generated by a counter, may also be used.

Figures 5, 6:
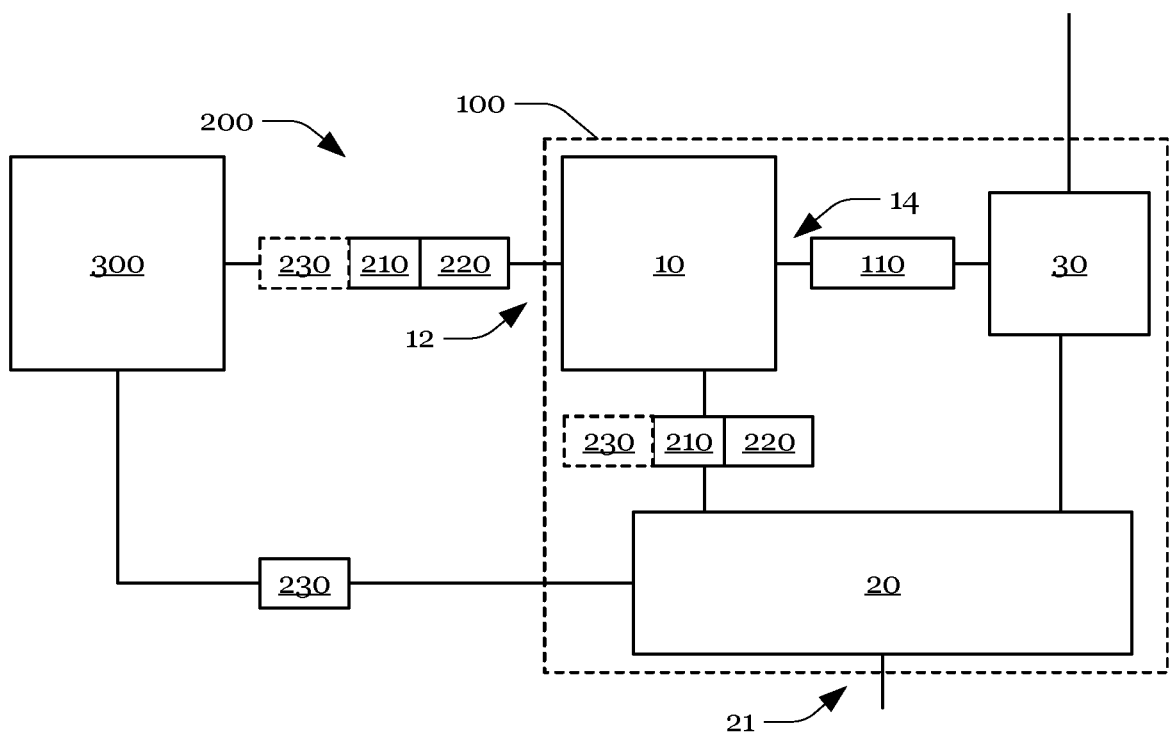
FIG. 5 illustrates a modification of the transmitter shown in FIG. 4.
FIG. 6 schematically illustrates the integrated circuit.

As shown in FIG. 5, the integrated circuit 20 may comprise a configuration interface 21 which cannot be addressed by the controller 10. Via the configuration interface 21, the integrated circuit 20 may receive the verification key for performing the verification of the signature 220 and a password by means of which communication partners can authenticate themselves at the integrated circuit 20, wherein the integrated circuit 20 refuses communications with non-authenticated communication partners. As shown in FIG. 6, the verification key may be persistently stored in a verification key memory 22 and the password may be persistently stored in a password memory 23. Comparison of the stored password with the password received during authentication may then be performed by a password verification circuit 24.

If the authentication is successful, the password verification circuit 24 allows for a communication with the authenticated communication partner via the communication interface 27 and the verification of the signature 220 received from the authenticated communication partner by the signature verification circuit 25, which is also responsible for generating the verification result output at port 26. Furthermore, the random data may be output by a random data generation circuit 28 at a separate port or via the communication interface 27.

The configuration interface 21 may, for example, be an NFC interface, wherein the verification key and the password are set during start-up by use of a special parameterization device. Alternatively, the configuration may also be set by the controller 10 using a secured procedure. This would increase the overall convenience because no separate configuration interface 21 with tools to be provided separately would then be necessary. For example, a password could be used which would be necessary to authorize the change of the verification key and/or the authentication password and which would not be stored persistently in the controller 10.

Figure 7:
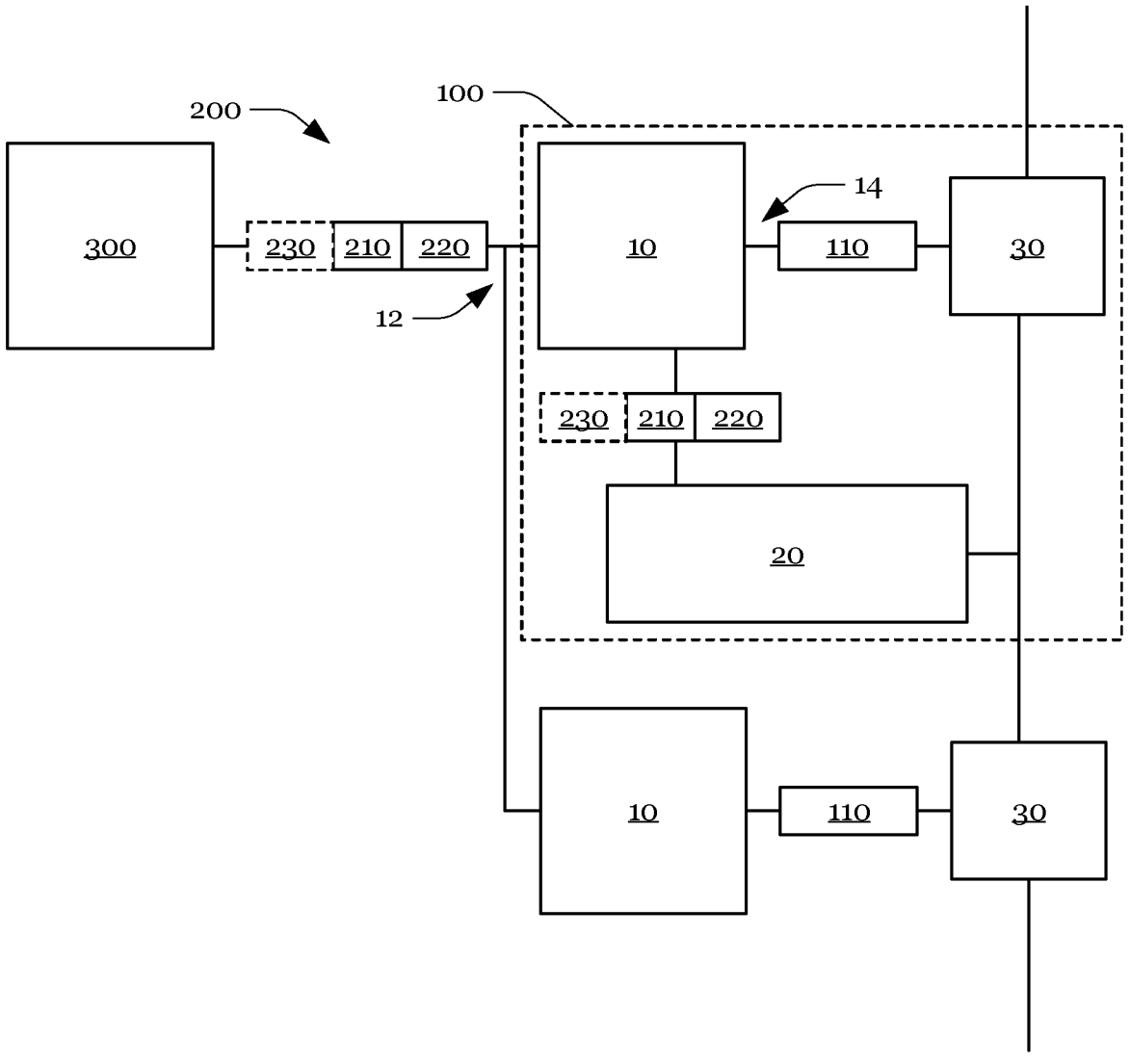
FIG. 7 illustrates a modification of the transmitter shown in FIG. 5.

As shown in FIG. 7, the integrated circuit 20 may monitor not just one but two or more communication channels simultaneously, as the input information for each communication channel is identical. It would therefore be sufficient if only one communication channel transmits the received data to the integrated circuit 20. The enable output 26 of the integrated circuit 20 may then approve the outputs of all communication channels simultaneously. Alternatively, a separate further integrated circuit 20 may be used for each communication channel or group of communication channels.

Since a cryptographic signature 220 may be formed of significantly more bits than is necessary for simple systematic redundancy to detect random errors, more transmission capacity may be required on the communication channel. However, if accepting a reduced error detection speed, it would be sufficient if only a part of the signature 220 which relates to a specific payload set, would be transmitted per data packet 200. In such a case, an inconsistency in the payload would only be recognizable after a somewhat longer time period. However, less space would be required in the data packets 200.

The integrated circuit 20 may comprise several enable outputs 26 and approve different control signals 110 independently of one another.

The controller 10 may be enabled to read a current approval state of the integrated circuit 20. This may be advantageous as the controller 10 cannot carry out a verification itself due to its lack of knowledge of the verification key and therefore does not know whether it is authorized to output potentially dangerous control signals 110 at all.

The functionality provided by the integrated circuit 20 (which is a separate hardware component) could be provided by the controller 10. In this case, the strength of the protective effect would depend on the technical protection against manipulation of the protective function. However, increased safety can be achieved above all by separating the communication channel and the protective function from each other in such a way that they are only connected to each other via an interface via which the protective function cannot be changed or manipulated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A transmitter comprising:
   a controller configured to receive data that is provided with a signature, derive control signals from the data, and output the control signals to a circuitry;
   an integrated circuit configured to verify the signature, generate a verification result and output the verification result to the circuitry;
   the circuitry, the circuitry being configured to, depending on the verification result output by the integrated circuit, reject the control signals or transmit the control signals to a receiver via a communication channel;
   a second controller configured to receive the data that is provided with the signature, to derive control signals from the data, and to output the control signals; and
   second circuitry configured to, depending on a verification result output by the integrated circuit, reject the control signals output by the second controller or to transmit the control signals output by the second controller via another communication channel.

2. The transmitter of claim 1, wherein the integrated circuit is further configured, when verifying the signature, to verify an integrity of the data and/or an identity of a sender of the data.

3. The transmitter of claim 1, wherein the integrated circuit is further configured to receive the data and/or the signature from the controller.

4. The transmitter of claim 1, wherein the integrated circuit is further configured to verify the data.

5. The transmitter of claim 1, wherein the integrated circuit is further configured to provide a sender of the data with additional data to be used by the sender when generating the signature.

6. The transmitter of claim 1, wherein the integrated circuit comprises an interface and the integrated circuit is further configured to receive a key for performing the verification of the signature via the interface.

7. The transmitter of claim 6, wherein the interface cannot be accessed by the controller.

8. A transmitter comprising:

a controller configured to receive data that is provided with a signature, derive control signals from the data, and output the control signals;

an integrated circuit configured to verify the signature; and circuitry configured to, depending on a verification result output by the integrated circuit, reject the control signals or transmit the control signals to a receiver via a communication channel, wherein the integrated circuit is further configured to verify the data, and wherein the integrated circuit is further configured, when verifying the data, to determine an age of the data and/or to assign the data to a hazard level.

9. A transmitter comprising:

a controller configured to receive data that is provided with a signature, derive control signals from the data, and output the control signals;

an integrated circuit configured to verify the signature; and circuitry configured to, depending on a verification result output by the integrated circuit, reject the control signals or transmit the control signals to a receiver via a communication channel, wherein the integrated circuit comprises an interface and the integrated circuit is further configured to receive a key for performing the verification of the signature via the interface, and wherein the integrated circuit is further configured to receive a password via the interface and accept the signature from the controller or another communication partner only if the communication partner has authenticated itself with the password.

* * * * *